United States Patent [19]
Yamada et al.

[11] Patent Number: 6,121,873
[45] Date of Patent: Sep. 19, 2000

[54] DEVICE FOR PRODUCING ELECTRICAL SIGNALS INDICATING YAW RATE, LATERAL ACCELERATION AND ROLL RATE OF VEHICLE BODY

[75] Inventors: Yoshihisa Yamada, Suntoh-gun; Hirotada Otake, Susono, both of Japan

[73] Assignee: Toyota Jidosha Kabushiki Kaisha, Toyota, Japan

[21] Appl. No.: 09/288,223

[22] Filed: Apr. 8, 1999

[30] Foreign Application Priority Data

May 14, 1998 [JP] Japan .................................. 10-150649

[51] Int. Cl.⁷ ...................................................... B60Q 1/00
[52] U.S. Cl. ............................ 340/440; 340/441; 701/70; 303/147
[58] Field of Search ..................................... 340/438, 439, 340/440, 441; 701/70; 303/146, 147

[56] References Cited

U.S. PATENT DOCUMENTS

| | | | |
|---|---|---|---|
| 4,898,431 | 2/1990 | Karnopp et al. | 303/146 |
| 5,051,735 | 9/1991 | Furukawa | 340/905 |
| 5,948,027 | 9/1999 | Oliver, Jr. et al. | 701/37 |
| 6,002,974 | 12/1999 | Schiffmann | 340/440 |

FOREIGN PATENT DOCUMENTS

| | | |
|---|---|---|
| 2-70561 | 3/1990 | Japan . |
| 6-297985 | 10/1994 | Japan . |
| 10-81215 | 3/1998 | Japan . |

*Primary Examiner*—Daniel J. Wu
*Attorney, Agent, or Firm*—Oliff & Berridge, PLC

[57] ABSTRACT

A device is proposed to provide electrical signals indicating four parameters such as the so-called vehicle speed, yaw rate, lateral acceleration and roll rate a vehicle body by using three parameter detection means such as a vehicle speed sensor, a turn rate sensor and a transverse acceleration sensor, or to provide electrical signals indicating three parameters such as the so-called yaw rate, roll rate and lateral acceleration of a vehicle by using two transverse acceleration sensors.

5 Claims, 4 Drawing Sheets

DEVICE FOR PRODUCING ELECTRICAL SIGNALS INDICATING YAW RATE, LATERAL ACCELERATION AND ROLL RATE OF VEHICLE BODY

BACKGROUND OF THE INVENTION

1. Field of the Invention

The present invention related to a device for producing electrical signals indicating the so-called yaw rate, lateral acceleration and roll rate of a vehicle body of a vehicle.

2. Description of the Prior Art

The so-called yaw rate, lateral acceleration and roll rate are important parameters in the vehicle running behavior control flourishing nowadays in the field of automobile technologies. It goes without saying that the vehicle speed is also one of the most basic parameters needed for a general running control of vehicles.

The yaw rate, the lateral acceleration and the roll rate are each directly detectable by a yaw rate sensor, a lateral acceleration sensor and a roll sensor, respectively. When these parameters are respectively detected by the corresponding detectors, it is a matter of course that the same number of sensors are required as a number of parameters to be detected.

In Japanese Patent Laid-open Publication 2-70561, it is described to detect a yaw rate of a vehicle body by a coordination of two lateral acceleration sensors mounted at a front and a rear portion of the vehicle body, respectively, wherein the yaw rate is obtained through a calculation based upon the transverse accelerations detected by the two lateral sensors, with incorporation of a longitudinal shift distance between the two lateral sensors in the vehicle body. In this case, two sensors are used to obtain two parameters, i.e. the yaw rate and the lateral acceleration, provided that the lateral acceleration is also a parameter needed.

SUMMARY OF THE INVENTION

In view of the even correspondence between the number of sensors and the number of parameters to be detected in the conventional or prior art against, it is a primary object of the present invention to provide a device for producing a plurality of electrical signals indicating respectively separate parameters for use in a vehicle running behavior control by a less number of parameter detection means than the number of the parameters.

According to the present invention, the above-mentioned primary object is accomplished by a device for producing first, second, third and fourth electrical signals indicating the so-called vehicle speed, yaw rate, lateral acceleration and roll rate of a vehicle body of a vehicle, respectively, comprising:

means for detecting a vehicle speed, so as to produce the first electrical signal;

means mounted on the vehicle body as positioned substantially at a center of gravity of the vehicle body for detecting a turn rate of itself around a vertical axis thereof, so as to produce the second electrical signal;

means mounted on the vehicle body as vertically shifted from the turn rate detection means for detecting an acceleration applied thereto in a horizontal direction transverse to a longitudinal axis of the vehicle body;

means for calculating a product of the vehicle speed detected by the vehicle speed detection means and the turn rate detected by the turn rate detection means, so as to produce the third electrical signal; and means for calculating a quotient of a difference between the transverse acceleration detected by the transverse acceleration detection means and the above-mentioned product divided by a vertical shift distance of the transverse acceleration detection means relative to the turn rate detection means and integrating the quotient on a time basis, so as to produce the fourth electrical signal.

By such a device, electrical signals indicating four parameters such as the so-called vehicle speed, yaw rate, lateral acceleration and roll rate are available by using three parameter detection means with respect to vehicle speed, turn rate and transverse acceleration.

When the vehicle has a roof portion, the transverse acceleration detection means may desirably be mounted at the roof portion.

Further, the transverse acceleration detection means may desirably be substantially aligned vertically with the turn rate detection means.

Alternatively, the above-mentioned primary object is accomplished by a device for producing first, second and third electrical signals indicating the so-called yaw rate, roll rate and lateral acceleration of a vehicle body of a vehicle, respectively, comprising:

means mounted on the vehicle body at a first position thereof for detecting a first acceleration applied thereto in a horizontal direction transverse to a longitudinal axis of the vehicle body;

means mounted on the vehicle body at a second position thereof shifted in a longitudinal and a vertical direction of the vehicle body from the first position by a longitudinal and a vertical shift distance, respectively, for detecting a second acceleration applied thereto in a horizontal direction transverse to the longitudinal axis of the vehicle body;

means for calculating a first quotient of a difference between the first and the second acceleration divided by the longitudinal shift distance and integrating the first quotient on a time basis, so as to produce the first electrical signal;

means for calculating a second quotient of a difference between the first and the second acceleration divided by the vertical shift distance and integrating the second quotient on a time basis, so as to produce the second electrical signal; and means for calculating an average of the first and the second acceleration weighted by a ratio of a longitudinal shift distance of the second position from a center of gravity of the vehicle body to a longitudinal shift distance between the first and second positions and a ratio of a longitudinal shift distance of the first position from the center of gravity of the vehicle body to the longitudinal shift distance between the first and second positions, respectively, and modifying the weighted average by a pertinent component of the second quotient, so as to produce the third electrical signal.

By such a device, electrical signals indicating three parameters such as the so-called yaw rate, roll rate and lateral acceleration of a vehicle are available by using two transverse acceleration detection means.

In this case, when the vehicle body has a roof portion and a base portion, the first transverse acceleration detection means may desirably be mounted at the roof portion of the vehicle body in a front part thereof, while the second transverse acceleration means may desirably be mounted at the base portion of the vehicle body in a rear part thereof.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
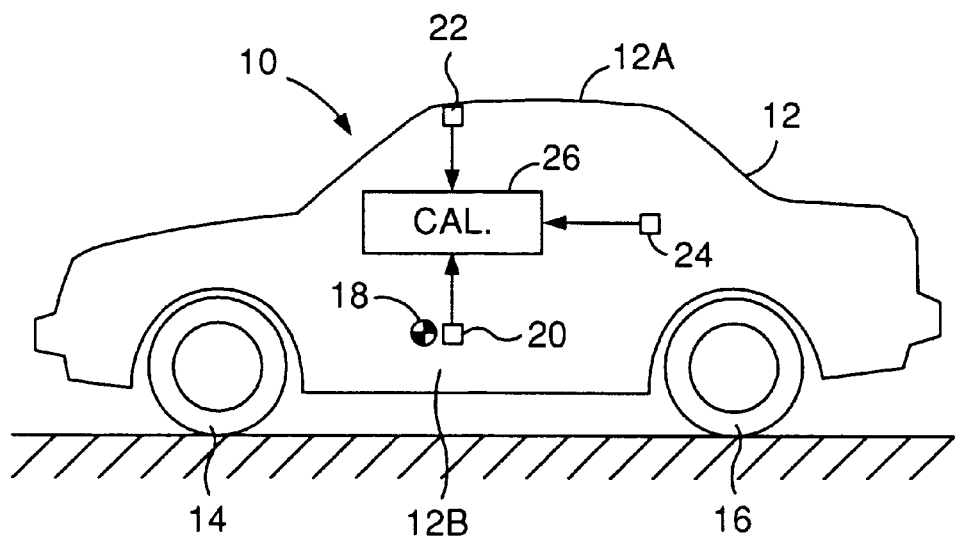
FIG. 1 is a diagrammatical side view of a vehicle, more particularly a car, in which the device according to the present invention is installed in the form of a first embodiment.
Figure 2:
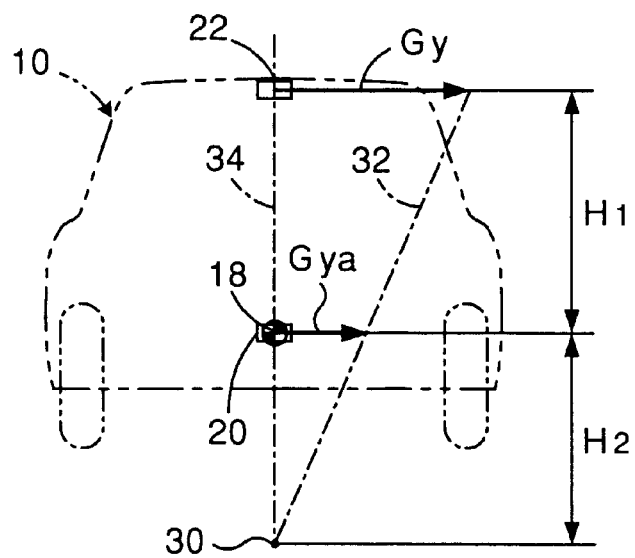
FIG. 2 is a diagrammatical rear view of the vehicle of FIG. 1, showing a relationship between two transverse accelerations detected by two transverse acceleration detection means and an instant roll center of a vehicle body.

Referring to FIGS. 1 and 2, 10 is a vehicle having a vehicle body 12 including a roof portion 12A and a base portion 12B, supported by a pair of front wheels 14 and a pair of rear wheels 16. 18 shows a center of gravity of the vehicle body 12. The device according to the first embodiment of the present invention comprises means 20 for detecting turn rate of itself around a vertical axis thereof (called "yaw rate sensor" hereinunder for convenience) mounted on the vehicle body 12 as substantially coincided with the center of gravity 18. In the embodiment herein shown the yaw rate sensor 20 is positioned exactly at the center of gravity 18, although in FIG. 1 the yaw rate sensor 20 is shown as positioned adjacent the center of gravity 18 at the rear side thereof for the clarity of illustration. Indeed, there is generally no particular mass or the like at the center of gravity which interferes with a mounting of the yaw rate sensor 20. When the vehicle is a car, it will generally be possible to mount the yaw rate sensor 20 on a base portion 12B as positioned substantially at the center of gravity of the vehicle body.

The device further comprises means 22 for detecting an acceleration applied thereto in a horizontal direction transverse to a longitudinal axis (not shown) of the vehicle body 12 (called "transverse acceleration sensor" hereinunder for convenience) mounted on the vehicle body, preferably at the roof portion 12A thereof, as vertically shifted relative to the yaw rate sensor 20 by a vertical shift distance Ho. Further, it will be more desirable that the transverse acceleration sensor 22 is positioned to be substantially aligned vertically with the yaw rate sensor 20, so that a roll rate of the vehicle body is more precisely calculated based upon the sensors 20 and 22 as described hereinunder.

The device further comprises means 24 for detecting a vehicle speed (called "vehicle speed sensor" hereinunder for convenience). Since the vehicle speed detection is one of the most essential operations in driving a vehicle, the vehicle speed sensor 24 may not be a sensor particularly provided for the device according to the present invention, although it is one of the parameter detection means which define the first embodiment of the device according to the present invention, while the vehicle speed detected thereby is one of the plurality of parameters indicated by the corresponding plurality of electrical signals produced by the first embodiment of the device according to the present invention.

The device further comprises means 26 for making calculations described hereinunder. The means 26 may be made of an ordinary electronic micro-computer having such components as the so-called central processor unit (CPU), read only memory (ROW, random access memory (RAM), input and output port means and common bus interconnecting these components. The calculation means 26 are supplied with an output of the yaw rate sensor 20 representing the turn rate detected thereby, an output of the transverse acceleration sensor 22 representing the transverse acceleration detected thereby, and an output of the vehicle speed sensor 24 representing the vehicle speed detected thereby, and conduct calculations based upon those signals as described hereinunder with reference to the flowchart of FIG. 3.

Figure 3:
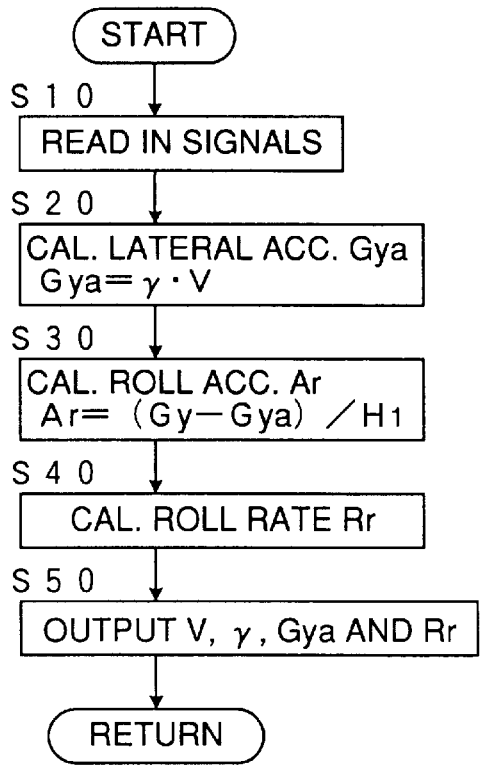
FIG. 3 is a flowchart showing an operation of the first embodiment of the present invention shown in FIGS. 1 and 2.

Referring to FIG. 3, the calculations along the flowchart herein shown are started upon a turn-on of an ignition switch (not shown) of the vehicle, and are repeated at a cycle time such as tens of micro-seconds until the ignition switch is turned off, as well known in the art.

When the operation is started, in step 10, signals by the outputs of the sensors 20, 22 and 24 are read in by the calculation means 26, so as to obtain a turn rate $\gamma$ of the vehicle body around a vertical axis of the yaw rate sensor 20, substantially corresponding to the so-called yaw rate of the vehicle body, a transverse acceleration Gy of the vehicle body at the position of the transverse acceleration sensor 22, and a vehicle speed V.

In step 20, a lateral acceleration Gya of the vehicle body at the position of the yaw rate sensor 20, substantially corresponding to the lateral acceleration of the vehicle body at the center of gravity thereof, is calculated as follows:

$$Gya = \gamma \cdot V$$

In step 30, by taking the vertical shift distance $H_1$ of the transverse acceleration sensor 22 relative to the yaw rate sensor 20, a roll acceleration Ar is calculated as follows:

$$Ar = (Gy - Gya)/H_1$$

As will be noted in FIG. 2, the roll moment due to the difference Gy−Gya acts around a crossing point 30 of a phantom straight line 32 drawn through tip points of vectors expressing the transverse accelerations Gy and Gya and a phantom straight line 34 drawn through centers of the sensors 20 and 22, the point 30 being shifted below the center of the sensor 20, i.e. substantially the center of gravity 18 of the vehicle body, by a distance $H_2$, which is:

$$H_2 = H_1 \cdot Gya/(Gy - Gya)$$

Figure 4:
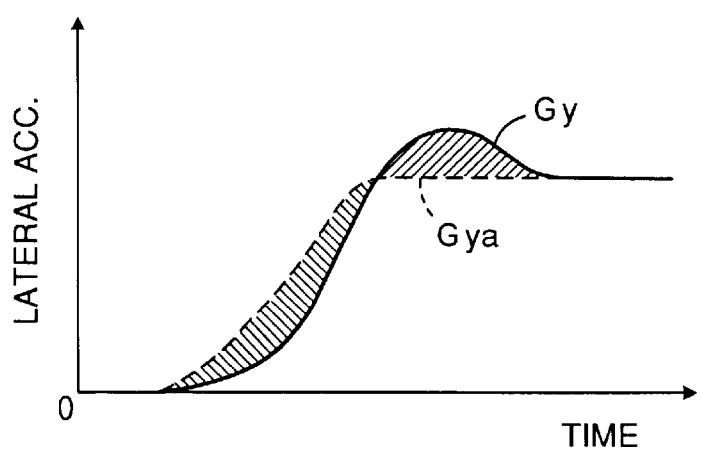
FIG. 4 is a graph showing a correlation of performances of two transverse accelerations detected by two separate transverse acceleration detection means.

When the vehicle makes a turn, the transverse acceleration Gya applied to the vehicle body substantially at the center of gravity 18 of the vehicle body and the transverse acceleration Gy detected by the transverse acceleration sensor 22 generally change as shown in FIG. 4, such that in an initial phase of a turn the transverse acceleration Gya is greater than that Gy, while Gy overshoots near the end of the turn so as to be greater than Gya.

In step 40, the roll acceleration Ar is integrated on a time basis to produce a roll rate Rr of the vehicle body around the roll center 30.

In step 50, electrical signals indicating the so-called vehicle speed V, yaw rate γ, lateral acceleration Gya and roll rate Rr of the vehicle body are output from the calculation means 26 for use by a running behavior control device (not shown) of the vehicle 10, and then the control returns to step 10 for repetition of the same processes.

Figure 5:
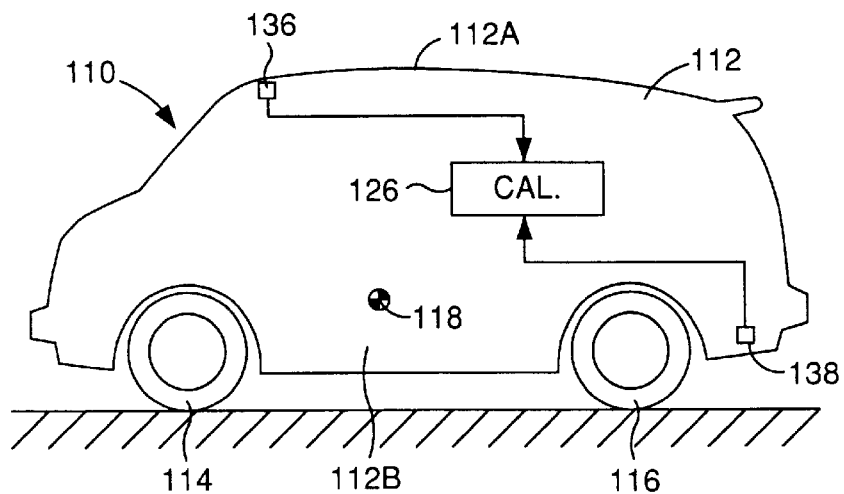
FIG. 5 is a diagrammatical side view of a vehicle, particularly a micro-bus, in which the device according to the present invention is installed in the form of a second embodiment.

FIG. 5 shows a second embodiment of the device according to the present invention. A vehicle 110 of a micro-bus type in which the second embodiment of the device according to the present invention is incorporated has a vehicle body 112 including a roof portion 112A and a base portion 112B with its center of gravity 118 being positioned near the based portion. The vehicle body is supported by a pair of front wheels 114 and a pair of rear wheels 116. Means 136 for detecting an acceleration applied thereto in a horizontal direction transverse to a longitudinal axis (not shown) of the vehicle body 112 (also called "transverse acceleration sensor" hereinunder for convenience) are mounted on the vehicle body at a front part of the roof portion 112A thereof, while similar means 138 for detecting an acceleration applied thereto in a horizontal direction transverse to the longitudinal axis of the vehicle body 112 (also called "transverse acceleration sensor" hereinunder for convenience) are mounted on the vehicle body at a rear part of the base portion 112B thereof.

The device further comprises calculation means 126 for making calculations described hereinunder. The means 126 may also be made of an ordinary electronic micro-computer having such components as the so-called central processor unit (CPU), read only memory (ROM, random access memory (RAM), input and output port means and common bus interconnecting these components. The calculation means 126 are supplied with an output of the transverse acceleration sensor 136 representing the transverse acceleration detected thereby as acting at the front part of the roof portion 112A, and an output of the transverse acceleration sensor 138 representing the transverse acceleration detected thereby as acting at the rear part of the base portion 112B, and conduct calculations based upon those signals as described hereinunder with reference to the flowchart of FIG. 6.

Figure 6:
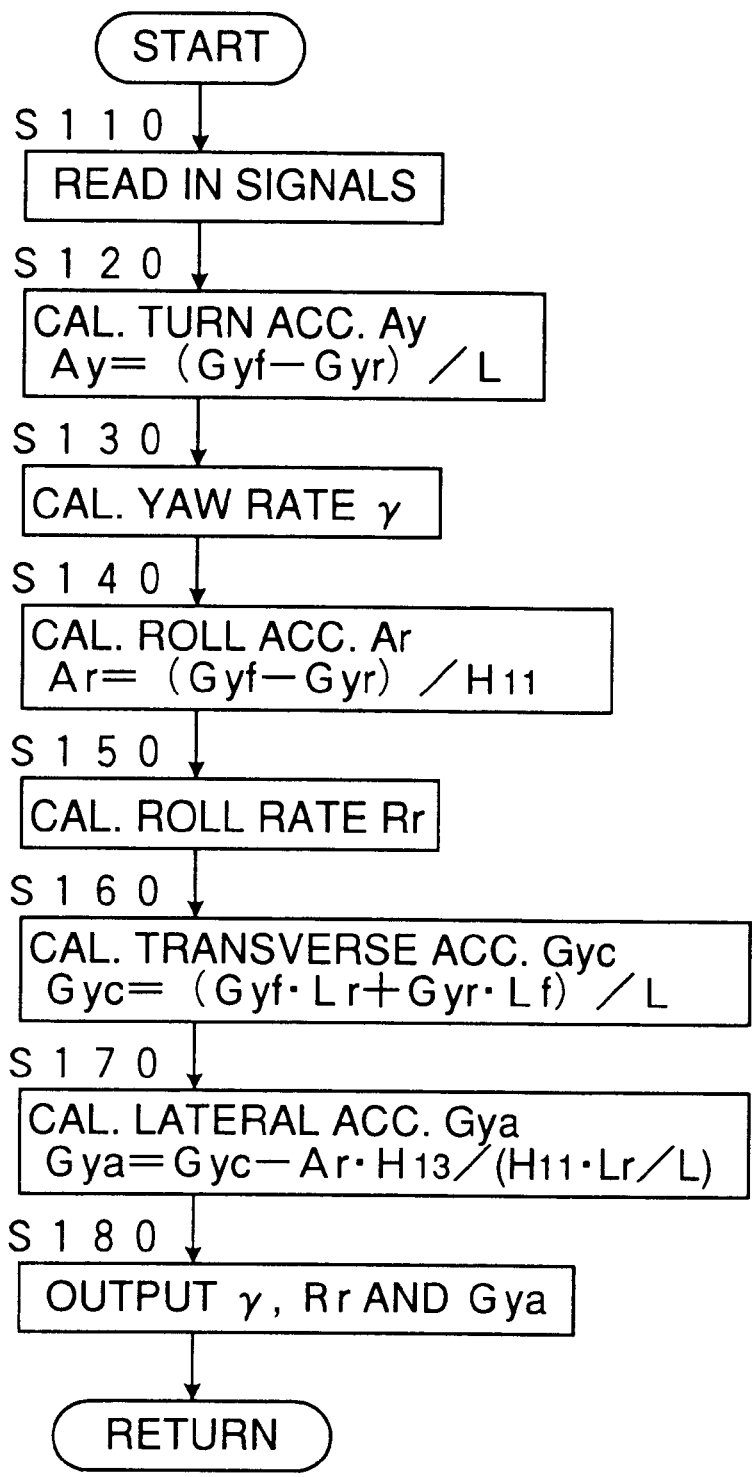
FIG. 6 is a flowchart showing an operation of the second embodiment of the present invention shown in FIG. 5.

Referring to FIG. 6, when it is started by a turn-on of an ignition switch (not shown) of the vehicle 110, in step 110 signals indicating transverse accelerations Gyf and Gyr detected by the transverse acceleration sensors 136 and 138, respectively, are read in.

Figure 7:
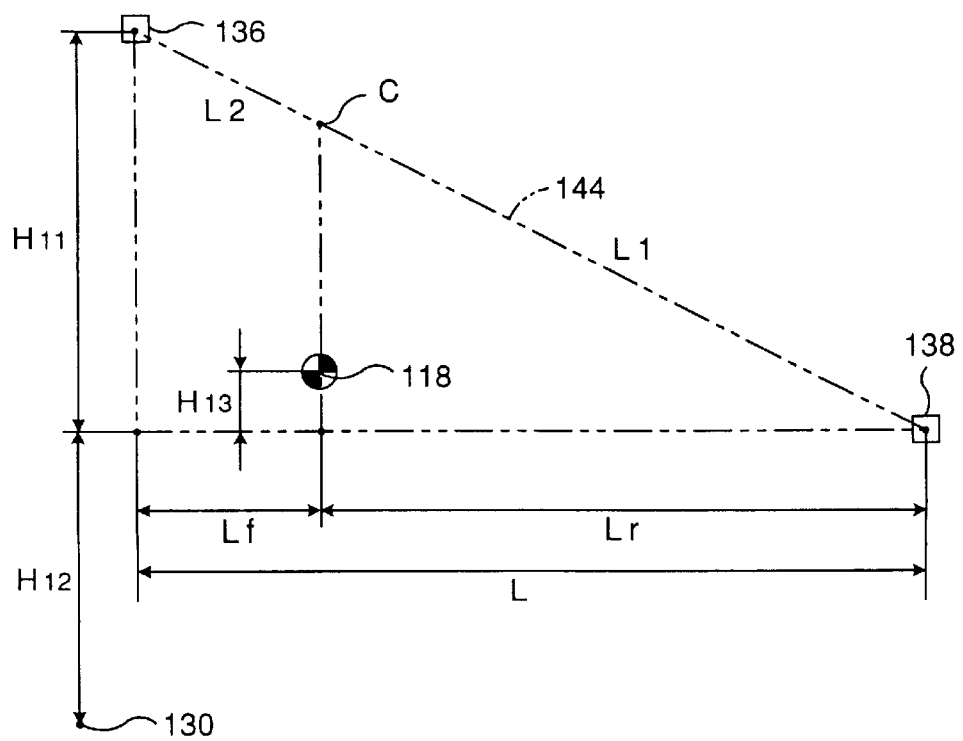
FIG. 7 is a diagram showing some dimensional relationships with regard to two transverse acceleration detection means incorporated in the embodiment shown in FIG. 5.

In step 120, a turn acceleration Ay of the vehicle body is calculated as follows:

$$Ay=(Gyf-Gyr)/L$$

wherein L is a longitudinal shift distance between the transverse acceleration sensors 136 and 138, as illustrated in FIG. 7.

In step 130, the turn acceleration Ay is integrated on a time basis to produce a yaw rate γ of the vehicle body 112. In this case, the center of yawing movement by the yaw rate γ is not determined. However, since the center of gravity 118 is positioned generally at a center of the length of the vehicle body, when the transverse acceleration sensors 136 and 138 are approximately equally longitudinally shifted from such a center of gravity, the yaw rate γ thus obtained will show the yaw rate substantially around the center of gravity of the vehicle body.

In step 140, a roll acceleration Ar is calculated as follows:

$$Ar=(Gyf-Gyr)/H_{11}$$

wherein $H_{11}$ is a vertical shift distance between the transverse acceleration sensors 136 and 138, as illustrated in FIG. 7. The roll acceleration Ar acts around a point 130 shifted below the transverse acceleration sensor 138 by a distance $H_{12}$, calculated as:

$$H_{12}=H_{11} \cdot Gyr/(Gyf-Gyr)$$

In step 150, the roll acceleration Ar is integrated on a time basis to produce a roll rate Rr.

In step 160, a lateral acceleration Gyc at a point C of the vehicle body positioned vertically above the center of gravity 118 on a phantom straight line 144 connecting centers of the sensors 136 and 138, is calculated as follows:

$$Gyc=(Gyf \cdot L2+Gyr \cdot L1)/(L1+L2)=(Gyf \cdot Lr+Gyr \cdot Lf)/L$$

wherein L1 and L2 are shift distances of the centers of the sensors 136 and 138 from the point C along the phantom line 144, while Lf and Lr are longitudinal shift distances of the centers of the sensors 136 and 138 relative to the center of gravity 118, respectively.

In step 170, a transverse acceleration Gya at the center of gravity 118 is calculated by modifying Gyc by a pertinent component of the roll acceleration Ar, as follows:

$$Gya=Gyc-Ar H_{13}/(H_{11} \cdot Lr/L)$$

wherein $H_{13}$ is a vertical shift distance of the center of gravity 118 above the transverse acceleration sensor 138 as illustrated in FIG. 7, while $H_{11} \cdot Lr/L$ is a vertical shift distance of the point C above the transverse acceleration sensor 138.

In step 180, electrical signals indicating the so-called yaw rate γ, roll rate Rr and lateral acceleration Gya of the vehicle body are output from the calculation means 126 for use by a running behavior control device (not shown) of the vehicle 110, and then the control returns to step 110 for repetition of the same processes.

Although the present invention has been described in detail with respect to some preferred embodiments thereof, it will be apparent for those skilled in the art that various modifications are possible with respect to the shown embodiments within the scope of the present invention.

What is claimed is:

1. A device for producing first, second, third and fourth electrical signals indicating vehicle speed, yaw rate, lateral acceleration and roll rate of a vehicle body of a vehicle, respectively, comprising:

means for detecting a vehicle speed, so as to produce the first electrical signal;

means mounted on the vehicle body as positioned substantially at a center of gravity of the vehicle body for detecting a turn rate of itself around a vertical axis thereof, so as to produce the second electrical signal;

means mounted on the vehicle body as vertically shifted from the turn rate detection means for detecting an acceleration applied thereto in a horizontal direction transverse to a longitudinal axis of the vehicle body;

means for calculating a product of the vehicle speed detected by the vehicle speed detection means and the turn rate detected by the turn rate detection means, so as to produce the third electrical signal; and means for calculating a quotient of a difference between the transverse acceleration detected by the transverse acceleration detection means and the above-mentioned product divided by a vertical shift distance of the transverse acceleration detection means relative to the turn rate detection means and integrating the quotient on a time basis, so as to produce the fourth electrical signal.

2. A system according to claim 1, wherein the vehicle body has a roof portion, and the transverse acceleration detection means are mounted at the roof portion.

3. A system according to claim 2, wherein the transverse acceleration detection means are substantially aligned vertically with the turn rate detection means.

4. A device for producing first, second and third electrical signals indicating yaw rate, roll rate and lateral acceleration of a vehicle body of a vehicle, respectively, comprising:

means mounted on the vehicle body at a first position thereof for detecting a first acceleration applied thereto in a horizontal direction transverse to a longitudinal axis of the vehicle body;

means mounted on the vehicle body at a second position thereof shifted in a longitudinal and a vertical direction of the vehicle body from the first position by a longitudinal and a vertical shift distance, respectively, for detecting a second acceleration applied thereto in a horizontal direction transverse to the longitudinal axis of the vehicle body;

means for calculating a first quotient of a difference between the first and the second acceleration divided by the longitudinal shift distance and integrating the first quotient on a time basis, so as to produce the first electrical signal;

means for calculating a second quotient of a difference between the first and the second acceleration divided by the vertical shift distance and integrating the second quotient on a time basis, so as to produce the second electrical signal; and means for calculating an average of the first and the second acceleration weighted by a ratio of a longitudinal shift distance of the second position from a center of gravity of the vehicle body to a longitudinal shift distance between the first and second positions and a ratio of a longitudinal shift distance of the first position from the center of gravity of the vehicle body to the longitudinal shift distance between the first and second positions, respectively, and modifying the weighted average by a pertinent component of the second quotient, so as to produce the third electrical signal.

5. A device according to claim 4, wherein the vehicle body has a roof portion and a base portion, and the first transverse acceleration detection means are mounted at the roof portion in a front part thereof, while the second transverse acceleration detection means are mounted at the base portion in a rear part thereof.

* * * * *